US012667941B2

(12) United States Patent
Zhang

(10) Patent No.: US 12,667,941 B2
(45) Date of Patent: Jun. 30, 2026

(54) RATCHET WRENCH

(71) Applicant: Yu Zhang, Longyou County (CN)

(72) Inventor: Yu Zhang, Longyou County (CN)

( * ) Notice: Subject to any disclaimer, the term of this patent is extended or adjusted under 35 U.S.C. 154(b) by 303 days.

(21) Appl. No.: 18/608,828

(22) Filed: Mar. 18, 2024

(65) Prior Publication Data

US 2025/0289099 A1 Sep. 18, 2025

(51) Int. Cl.
*B25B 13/46* (2006.01)

(52) U.S. Cl.
CPC .................................. *B25B 13/463* (2013.01)

(58) Field of Classification Search
CPC .... B25B 13/463; B25B 13/467; B25B 13/462
See application file for complete search history.

(56) References Cited

U.S. PATENT DOCUMENTS 5,636,557 A * 6/1997 Ma ........................ B25B 13/462 81/60
6,305,247 B1 * 10/2001 Chen ..................... B25B 13/463 81/58
6,862,955 B1 * 3/2005 Shu-Sui ................ B25B 13/463 81/58
7,100,477 B2 * 9/2006 Lee ....................... B25B 13/463 81/58
8,104,381 B1 * 1/2012 Chen ..................... B25B 13/463 81/63.2

* cited by examiner

*Primary Examiner* — Hadi Shakeri
(74) *Attorney, Agent, or Firm* — Justin Lampel

(57) ABSTRACT

A ratchet wrench includes a wrench body, a ratchet wheel, a first restriction member, a second restriction member, a pawl member, a direction control unit, and a first snap ring. The wrench body has a first receiving recess, a second receiving recess, and a third receiving recess. The ratchet wheel has a ratchet portion, a mounting portion, a first pivot portion, a first annular groove, a second pivot portion, and a rotation portion. The first restriction member has a first resting portion. The second restriction member has a second resting portion. The pawl member has an engaging portion and a concave cavity. The direction control unit is pivotally mounted in the third receiving recess, and includes a rotation member, a push member, and an elastic member. The first snap ring is snapped into the first annular groove.

9 Claims, 14 Drawing Sheets

RATCHET WRENCH

BACKGROUND OF THE INVENTION

Field of the Invention

The present invention relates to a hand tool and, more particularly, to a ratchet wrench.

Description of the Related Art

A conventional ratchet wrench was disclosed in the U.S. Pat. No. 6,862,955, and comprises a wrench body or handle 20, a positioning mechanism 30, a pawl element 40, a ratchet wheel mechanism 50, and a ring member 60. The wrench body 20 is provided with a first groove 21 and an internal crescent cavity 22. The positioning mechanism 30 is mounted in the first groove 21 and the internal crescent cavity 22 of the wrench body 20 and includes a tab 33 and a spring 34 mounted on the tab 33. The pawl element 40 is mounted in the internal crescent cavity 22 of the wrench body 20 and provided with a pawl section 41 and a bent portion 42. The bent portion 42 pushes the spring 34. The ratchet wheel mechanism 50 is mounted in the first groove 21 of the wrench body 20 and has a central opening 51. The ratchet wheel mechanism 50 meshes with the pawl section 41 of the pawl element 40. The ring member 60 is mounted on the wrench body 20 and restricts the ratchet wheel mechanism 50 to prevent the ratchet wheel mechanism 50 from being detached from the wrench body 20.

However, the conventional ratchet wrench has the following disadvantages.

1. The internal crescent cavity 22 of the wrench body 20 has two closed ends so that it is necessary to use an expensive T-shaped cutter for working the internal crescent cavity 22, thereby increasing the working cost.

2. After the T-shaped cutter enters the first groove 21 of the wrench body 20, the T-shaped cutter is moved toward the internal crescent cavity 22 to perform a successive cutting. Finally, the T-shaped cutter slightly rests on an inner peripheral face of the first groove 21. In such a manner, the T-shaped cutter has a blade for cutting and forming the internal crescent cavity 22 and has a shank limited by the inner peripheral face of the first groove 21. Thus, if the diameter of the shank of the T-shaped cutter is too large, the shank of the T-shaped cutter is easily broken due to an excessive force during the working process, thereby wearing and failing the T-shaped cutter.

3. The first groove 21 has a bottom provided with an abutting edge so that the first groove 21 has a stepped shape with a larger diameter and a smaller diameter. Thus, when a drill with a larger diameter is used to drill the first groove 21, it is necessary to watch the travel of the drill for working the larger diameter of the first groove 21, thereby increasing the working time and labor.

4. The inner peripheral face of the first groove 21 of the wrench body 20 is worked to form a second groove 24. When the diameter of the first groove 21 is more than 15 mm, it is easy to cut the second groove 24 by turning, but when the diameter of the first groove 21 is less than 12 mm, it is difficult to cut the second groove 24 by turning, thereby wasting the manual labor.

BRIEF SUMMARY OF THE INVENTION

In accordance with the present invention, there is provided a ratchet wrench comprising a wrench body, a ratchet wheel, a first restriction member, a second restriction member, a pawl member, a direction control unit, and a first snap ring. The wrench body is provided with a first receiving recess, a second receiving recess, a first resting face, a second resting face, a first arcuate face, a second arcuate face, and a third receiving recess. The ratchet wheel is provided with a ratchet portion, a mounting portion, a first pivot portion, a first annular groove, a second pivot portion, and a rotation portion. The first restriction member is provided with a first resting portion, a third arcuate, and a fourth arcuate face. The second restriction member is provided with a second resting portion, a fifth arcuate face, a sixth arcuate face, a first abutting portion, and a first abutting edge. The pawl member is provided with an engaging portion and a concave cavity. The direction control unit is pivotally mounted in the third receiving recess, and includes a rotation member, a push member, and an elastic member. The first snap ring is snapped into the first annular groove and rests on the first resting face so that the ratchet wheel is pivotally mounted in the first receiving recess.

According to the primary advantages of the present invention, the first receiving recess penetrates the wrench body, and the second receiving recess also penetrates the wrench body. Thus, when the cutting tool is used to work the first receiving recess and the second receiving recess, it is unnecessary to control the working depth of the cutting tool, thereby facilitating the efficiency for working the wrench body.

According to another advantage of the present invention, the first receiving recess and the second receiving recess are worked and molded by drills. The first receiving recess, the second receiving recess, and the third receiving recess are worked by the same machine. The first receiving recess, the second receiving recess, and the third receiving recess are drilled in the same direction. Thus, the tolerance will not be accumulated.

According to a further advantage of the present invention, each of the first receiving recess and the second receiving recess has two open ends. The wrench body is initially molded by forging, and then molded on a die by a secondary stamping, to completely form the first receiving recess, the second receiving recess, the first resting face, the second resting face, the first arcuate face, and the second arcuate face.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
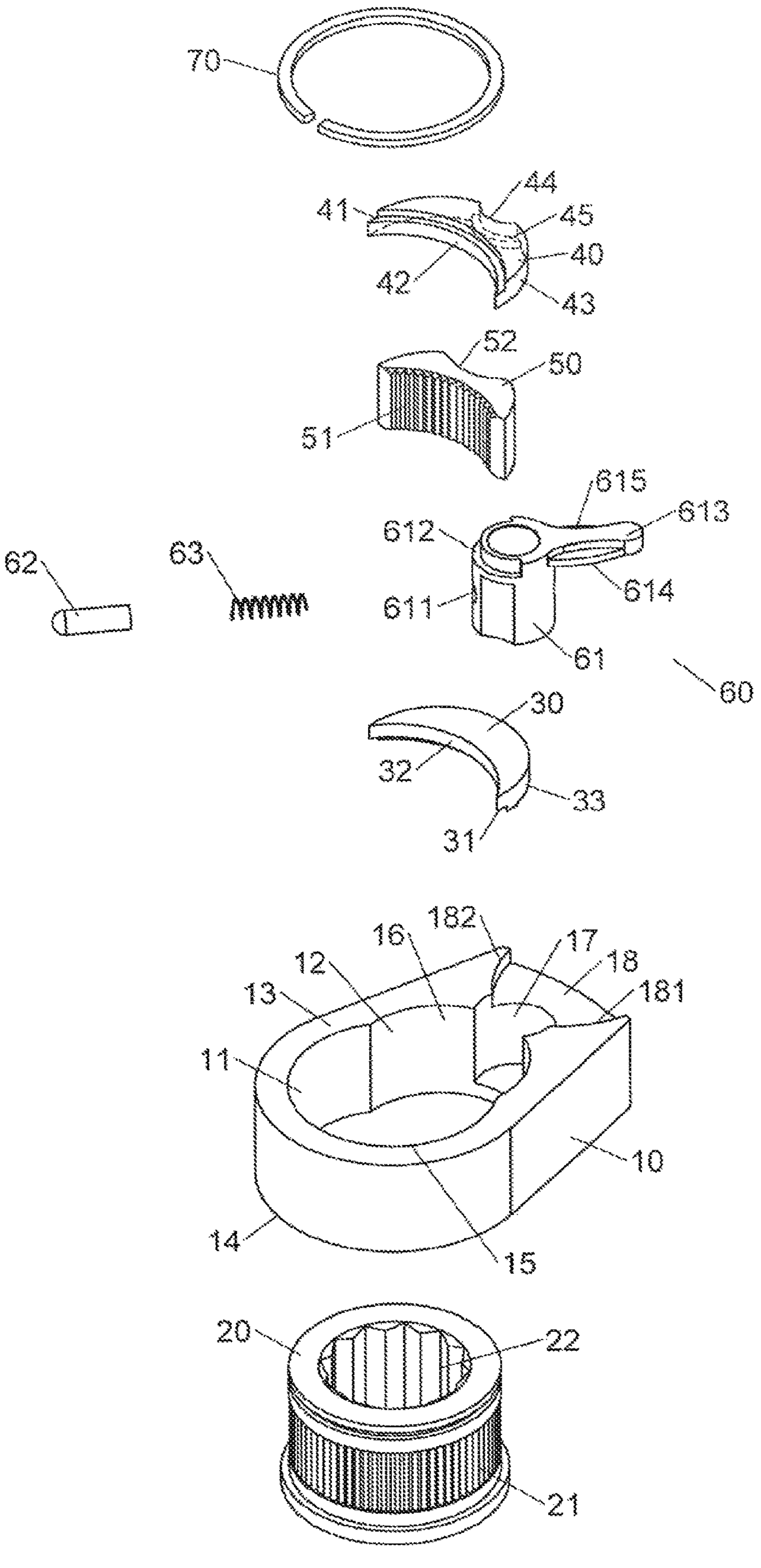
FIG. 1 is an exploded perspective view of a ratchet wrench in accordance with the preferred embodiment of the present invention.

Referring to the drawings and initially to FIGS. 1-9, a ratchet wrench in accordance with the preferred embodiment of the present invention comprises a wrench body 10, a ratchet wheel 20, a first restriction member 30, a second restriction member 40, a pawl member 50, a direction control unit 60, and a first snap ring 70.

The wrench body 10 is provided with a first receiving recess 11 which has a circular shape and penetrates the wrench body 10. The wrench body 10 is provided with a second receiving recess 12 beside the first receiving recess 11. The second receiving recess 12 is connected to the first receiving recess 11. The second receiving recess 12 has a center disposed in the first receiving recess 11 and has a diameter less than that of the first receiving recess 11. The second receiving recess 12 has a circular shape and penetrates the wrench body 10. The wrench body 10 is provided with a first resting face 13 and a second resting face 14. The first resting face 13 has a planar shape. The second resting face 14 has a planar shape. The first receiving recess 11 has a first arcuate face 15. The first arcuate face 15 is an internal arcuate face with a single diameter. The second receiving recess 12 has a second arcuate face 16. The second arcuate face 16 is an internal arcuate face with a single diameter. The wrench body 10 is provided with a third receiving recess 17 beside the second receiving recess 12. The third receiving recess 17 is connected to the second receiving recess 12. The third receiving recess 17 has a diameter less than that of the second receiving recess 12. The third receiving recess 17 has an open first end and a closed second end. The wrench body 10 is provided with a fourth receiving recess 18 beside the third receiving recess 17. The fourth receiving recess 18 is connected to the third receiving recess 17. The fourth receiving recess 18 is a cavity. The wrench body 10 is serially provided with the first receiving recess 11, the second receiving recess 12, the third receiving recess 17, and the fourth receiving recess 18. The fourth receiving recess 18 is provided with a first side face 181 and a second side face 182. The first side face 181 and the second side face 182 are arranged symmetrically relative to the fourth receiving recess 18. The first side face 181 is an arcuate face. The second side face 182 is an arcuate face.

The ratchet wheel 20 is pivotally mounted in the first receiving recess 11 and has a periphery provided with a ratchet (or toothed) portion 21 having an annular shape. The ratchet wheel 20 has a center provided with a mounting portion 22. The mounting portion 22 is a polygonal hole or a protruding square head. The ratchet wheel 20 has a first end provided with a first pivot portion 23 pivotally mounted in the first receiving recess 11. The first pivot portion 23 has a diameter more than or equal to a maximum diameter of the ratchet portion 21. The ratchet wheel 20 is provided with a first annular groove 24 directed toward the first resting face 13. The ratchet wheel 20 has a second end provided with a second pivot portion 25 pivotally mounted in the first receiving recess 11. The ratchet portion 21 is disposed between the first pivot portion 23 and the second pivot portion 25. The first pivot portion 23 and the second pivot portion 25 are arranged symmetrically relative to the ratchet portion 21. The second pivot portion 25 has a diameter equal to that of the first pivot portion 23 and more than or equal to the maximum diameter of the ratchet portion 21. The ratchet wheel 20 is provided with a protruding rotation portion 26 having a maximum diameter. The rotation portion 26 abuts the second resting face 14.

The first restriction member 30 is assembled with the wrench body 10 and received in the second receiving recess 12. The first restriction member 30 has an end face slightly protruding from the second resting face 14. The first restriction member 30 has a shape similar to that of the second receiving recess 12. The first restriction member 30 has a cross-sectional area slightly equal to that of the second receiving recess 12. The first restriction member 30 is provided with a first resting portion 31. The first restriction member 30 is provided with a third arcuate face 32 pivotally mounted on the second pivot portion 25. The third arcuate face 32 and the first arcuate face 15 have a same axis and a same diameter. The first restriction member 30 is provided with a fourth arcuate face 33 abutting the second arcuate face 16. The fourth arcuate face 33 and the second arcuate face 16 have a same axis and a same diameter.

The second restriction member 40 is assembled with the wrench body 10 and received in the second receiving recess 12. The second restriction member 40 has an end face slightly protruding from the first resting face 13. The second restriction member 40 is parallel with the first restriction member 30 with an interval being defined therebetween. The second restriction member 40 has a shape similar to that of the second receiving recess 12. The second restriction member 40 has a cross-sectional area slightly equal to that of the second receiving recess 12. The second restriction member 40 is provided with a second resting portion 41. The second restriction member 40 is provided with a fifth arcuate face 42 pivotally mounted on the first pivot portion 23. The fifth arcuate face 42 and the first arcuate face 15 have a same axis and a same diameter. The second restriction member 40 is provided with a sixth arcuate face 43 abutting the second arcuate face 16. The sixth arcuate face 43 and the second arcuate face 16 have a same axis and a same diameter. The second restriction member 40 is provided with a first abutting portion 44. The first abutting portion 44 and the third receiving recess 17 have a same axis and a same diameter. The first abutting portion 44 is a concave groove. The first abutting portion 44 is provided with a first abutting edge 45 directed toward the third receiving recess 17.

The pawl member 50 is received in the second receiving recess 12 and movable in the second receiving recess 12. The pawl member 50 is disposed between the first restriction member 30 and the second restriction member 40. The pawl member 50 has a first side provided with an engaging portion 51 engaging or meshing with the ratchet portion 21. The pawl member 50 has a second side having a center provided with a concave cavity 52 directed toward the third receiving recess 17.

The direction control unit 60 is pivotally mounted in the third receiving recess 17, and is rotatable in the third receiving recess 17 to drive and move the pawl member 50 in the second receiving recess 12, to control rotation of the ratchet wheel 20 in a normal direction and a reverse direction. The direction control unit 60 includes a rotation (swivel or turning) member 61, a push member (or an elastic abutting member) 62, and an elastic member 63.

The rotation member 61 has a cylindrical shape. The rotation member 61 is pivotally mounted in the third receiving recess 17 and provided with a receiving chamber 611. The rotation member 61 is provided with a second abutting edge 612 restricted by the first abutting edge 45 to prevent the rotation member 61 from being detached from the third receiving recess 17. The rotation member 61 is provided with a drive knob 613 received in the fourth receiving recess 18. The drive knob 613 is provided with a third side face 614 and a fourth side face 615. The third side face 614 rests on the first side face 181. After the drive knob 613 is rotated, the fourth side face 615 rests on the second side face 182. The third side face 614 is a convex face. The fourth side face 615 is a convex face.

The push member 62 is received in the receiving chamber 611. Preferably, the push member 62 is a column with a recess.

The elastic member 63 is elastically biased between the receiving chamber 611 and the push member 62. The push member 62 is pushed by the elastic member 63 and presses the concave cavity 52 so that the engaging portion 51 meshes with the ratchet portion 21.

The first snap ring 70 is snapped into the first annular groove 24 and rests on the first resting face 13 so that the ratchet wheel 20 is pivotally mounted in the first receiving recess 11. Preferably, the first snap ring 70 has a C-shaped profile.

The first abutting edge 45 restricts the second abutting edge 612 so that the direction control unit 60 is pivotally mounted in the third receiving recess 17. The rotation portion 26 rests on the second resting face 14 and restricts the first resting portion 31 to prevent the first restriction member 30 from being detached from the second receiving recess 12. The first snap ring 70 pivotally mounts and restricts the ratchet wheel 20 to prevent the ratchet wheel 20 from being detached from the first receiving recess 11. The first snap ring 70 restricts the second resting portion 41 to prevent the second restriction member 40 from being detached from the second receiving recess 12. Thus, the ratchet wheel 20, the first restriction member 30, the second restriction member 40, the pawl member 50, and the direction control unit 60 are assembled on the wrench body 10.

Figure 2:
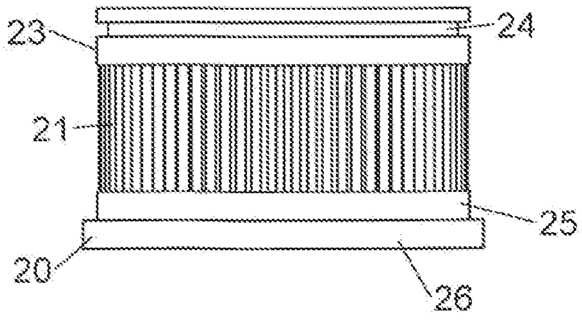
FIG. 2 is a front view of a ratchet wheel of the ratchet wrench in accordance with the preferred embodiment of the present invention.
Figure 3:
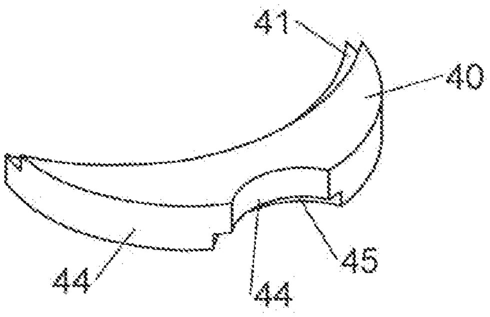
FIG. 3 is a perspective view of a second restriction member of the ratchet wrench in accordance with the preferred embodiment of the present invention.
Figure 4:
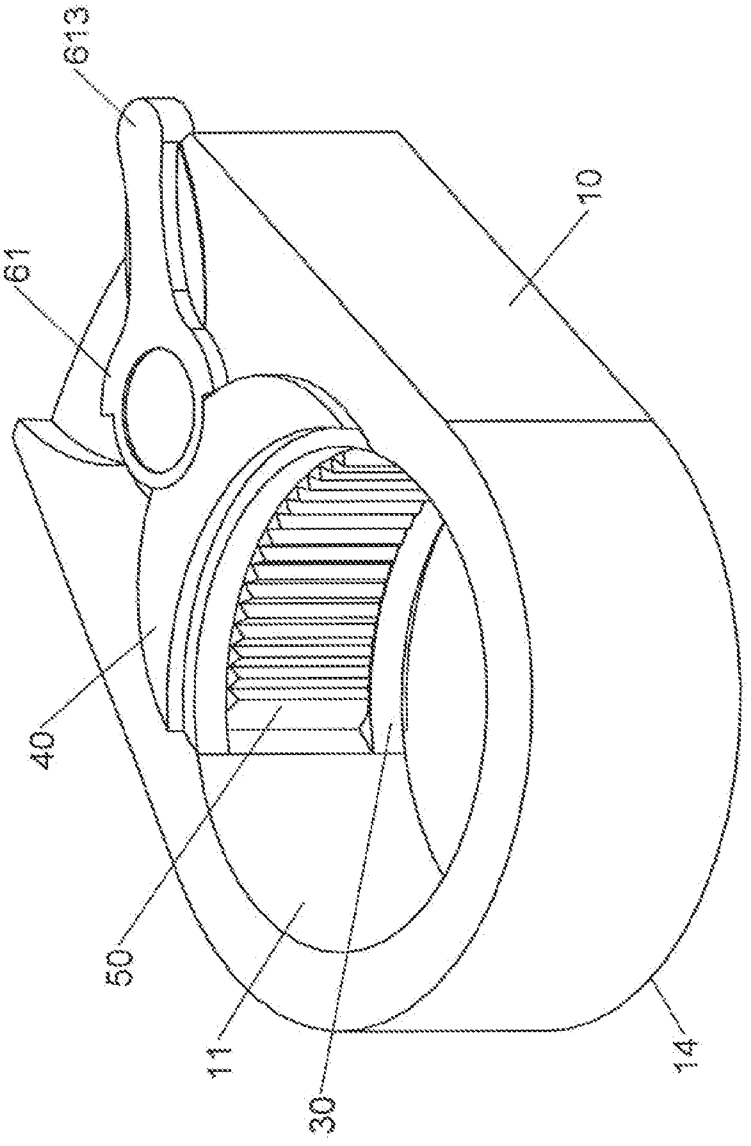
FIG. 4 is a partial perspective view of the ratchet wrench in accordance with the preferred embodiment of the present invention.
Figure 5:
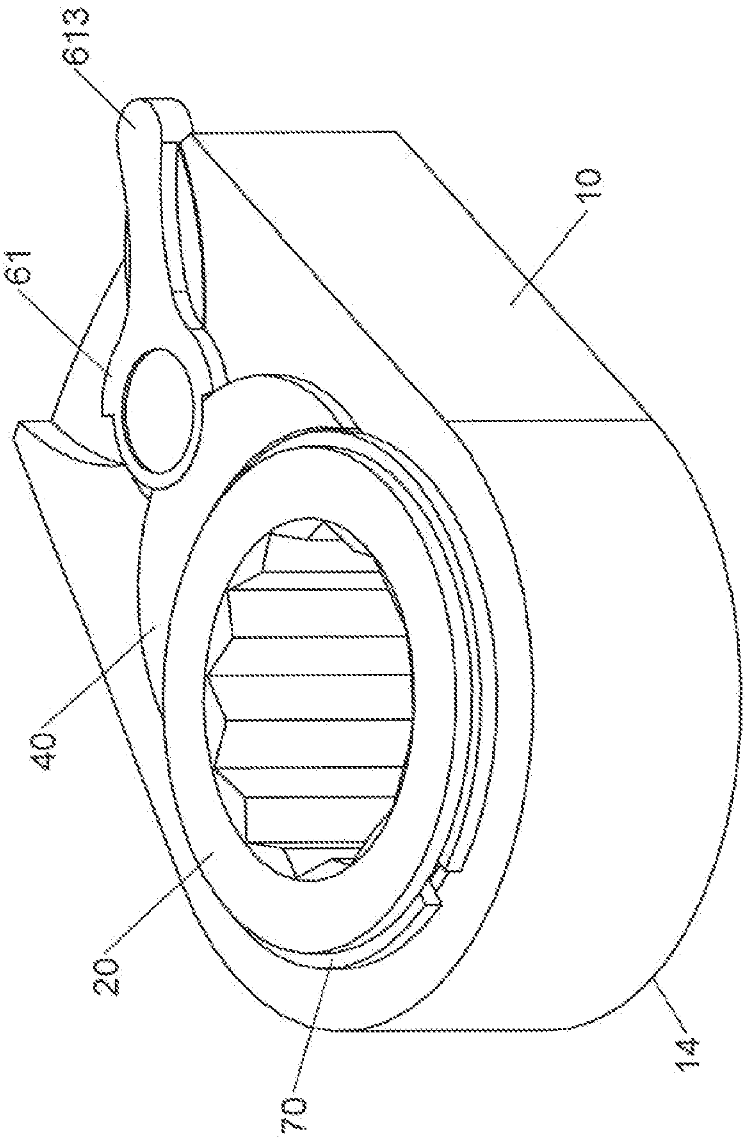
FIG. 5 is a perspective view of the ratchet wrench in accordance with the preferred embodiment of the present invention.
Figure 6:
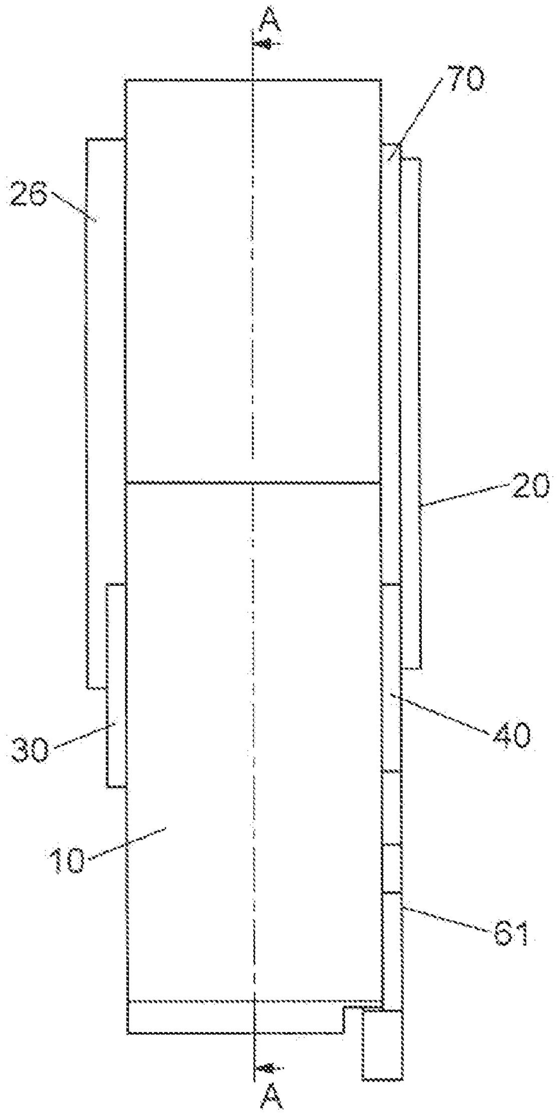
FIG. 6 is a side view of the ratchet wrench in accordance with the preferred embodiment of the present invention.
Figure 7:
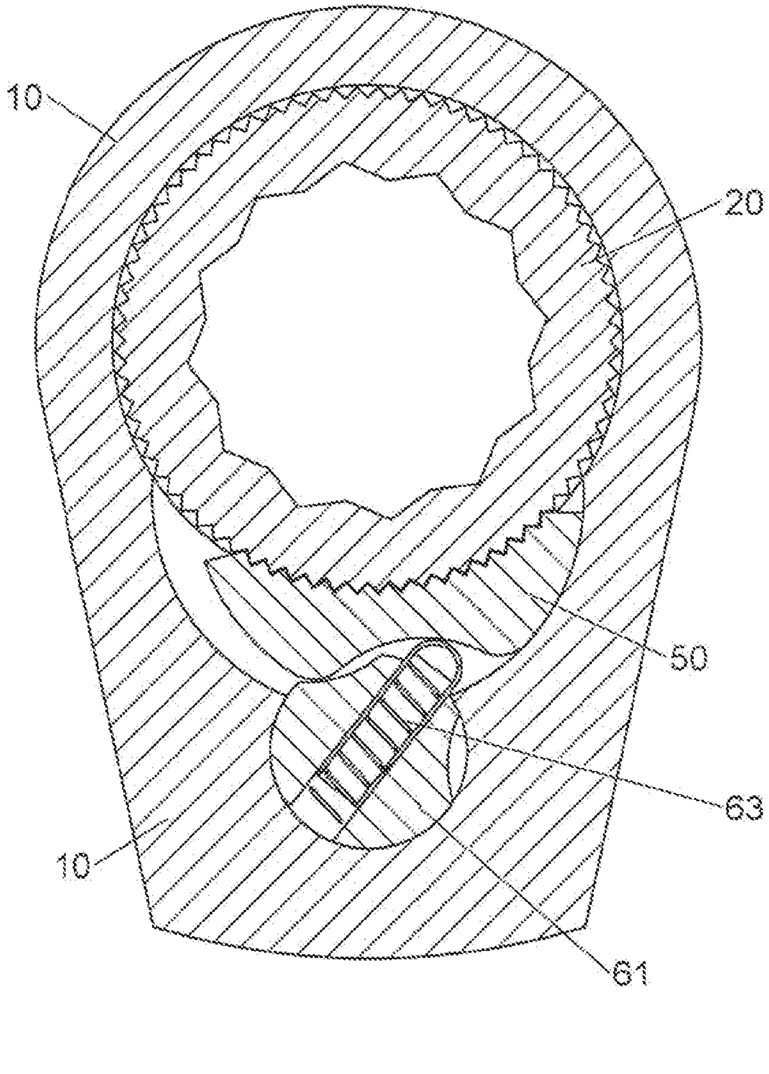
FIG. 7 is a cross-sectional view of the ratchet wrench taken along line A-A as shown in FIG. 6.

Referring to FIGS. 4-7 with reference to FIGS. 1-3, the direction control unit 60 is pivotally mounted in the third receiving recess 17. The pawl member 50 is initially received in the second receiving recess 12. Then, the first restriction member 30 and the second restriction member 40 are received in the second receiving recess 12 as shown in FIG. 4. Then, the ratchet wheel 20 is pivotally mounted in the first receiving recess 11, and the first snap ring 70 is snapped into the first annular groove 24 as shown in FIG. 5.

Figure 8:
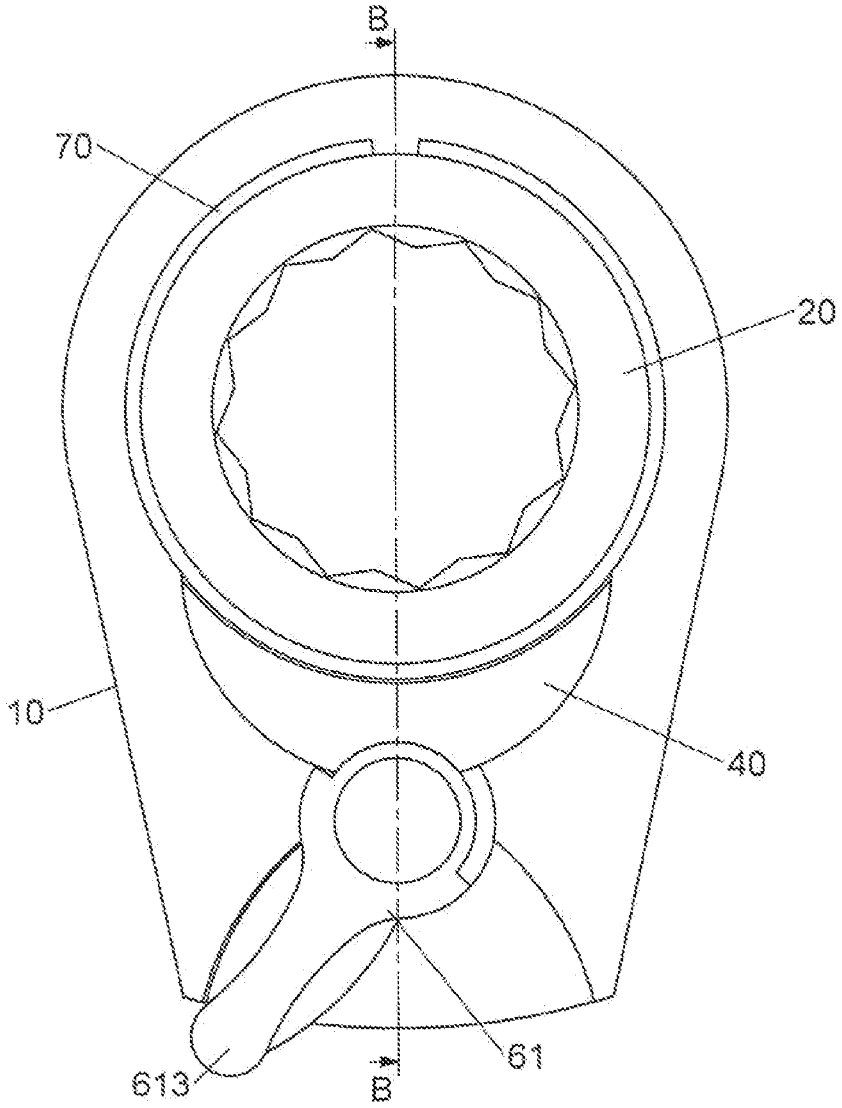
FIG. 8 is a top view of the ratchet wrench in accordance with the preferred embodiment of the present invention.
Figure 9:
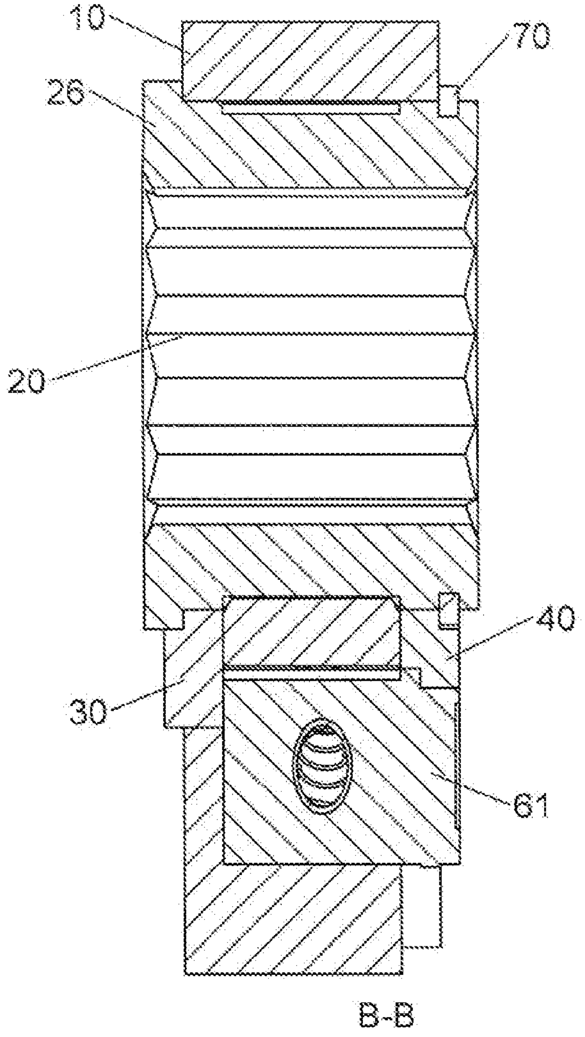
FIG. 9 is a cross-sectional view of the ratchet wrench taken along line B-B as shown in FIG. 8.

Referring to FIGS. 8 and 9 with reference to FIGS. 1-7, the drive knob 613 is moved to abut the first side face 181. The second restriction member 40 restricts the direction control unit 60 as shown in FIG. 9 so that the direction control unit 60 will not be detached from the third receiving recess 17. Then, the first restriction member 30, the second restriction member 40, and the pawl member 50 are limited by the ratchet wheel 20 and the first snap ring 70 and will not be detached from the wrench body 10.

Figure 10:
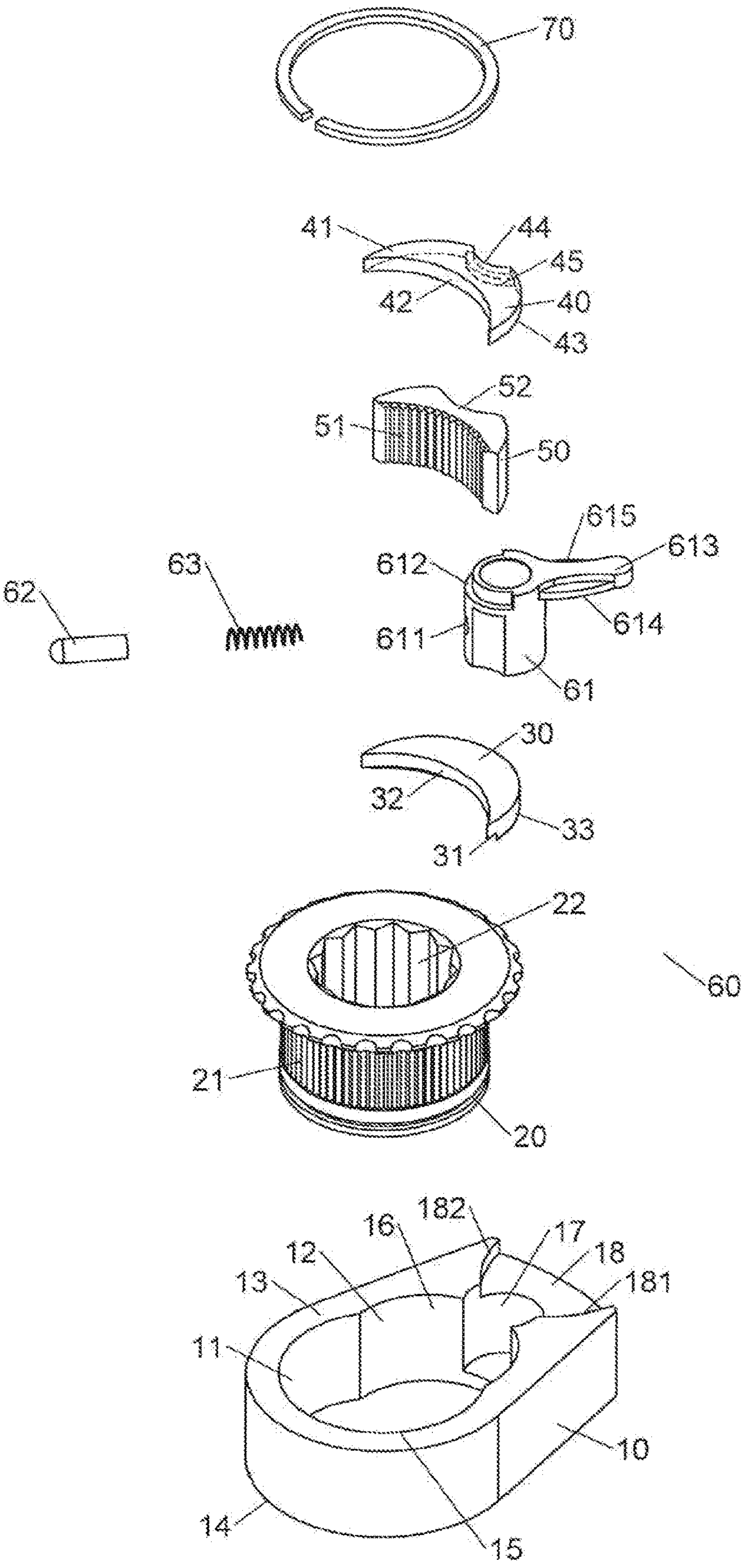
FIG. 10 is an exploded perspective view of a ratchet wrench in accordance with the second preferred embodiment of the present invention.
Figure 11:
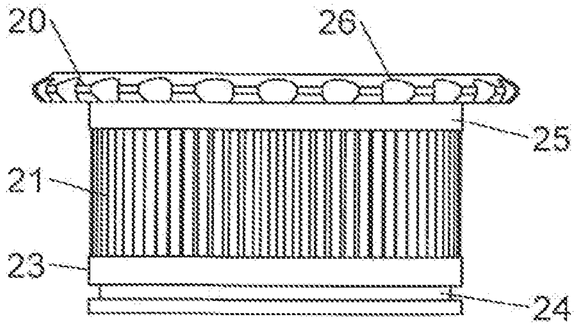
FIG. 11 is a front view of a ratchet wheel of the ratchet wrench in accordance with the second preferred embodiment of the present invention.
Figure 12:
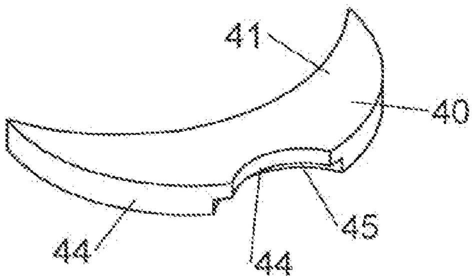
FIG. 12 is a perspective view of a second restriction member of the ratchet wrench in accordance with the second preferred embodiment of the present invention.
Figure 13:
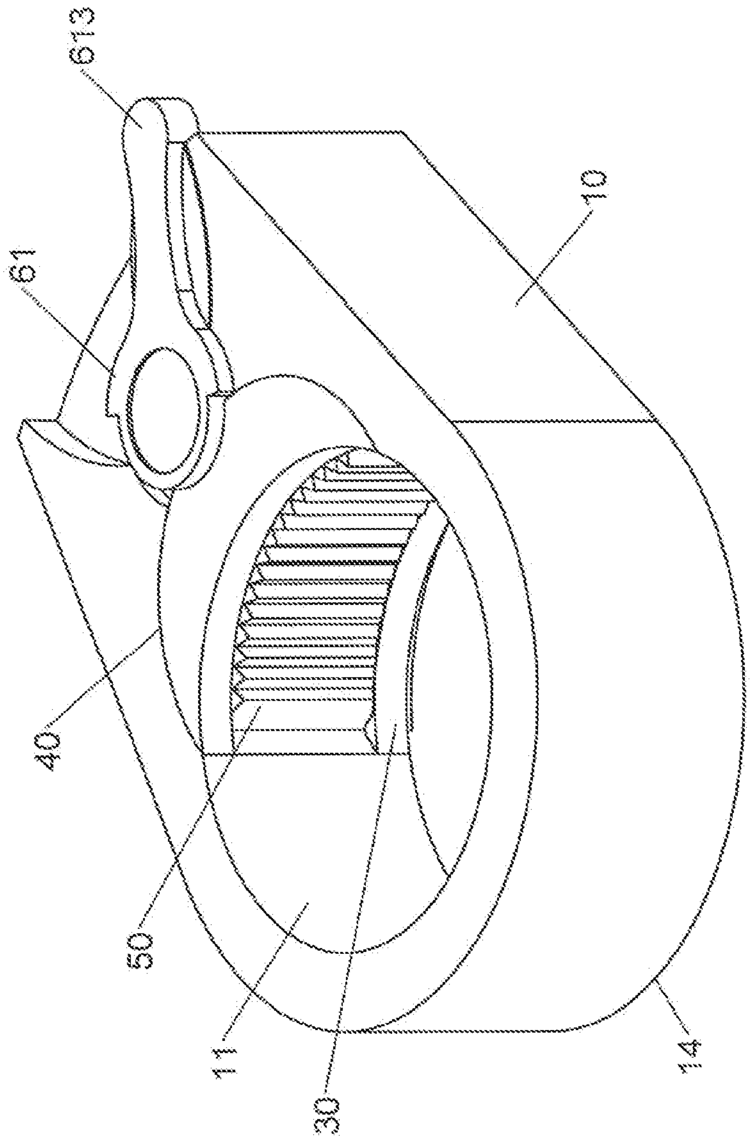
FIG. 13 is a partial perspective view of the ratchet wrench in accordance with the second preferred embodiment of the present invention.
Figure 14:
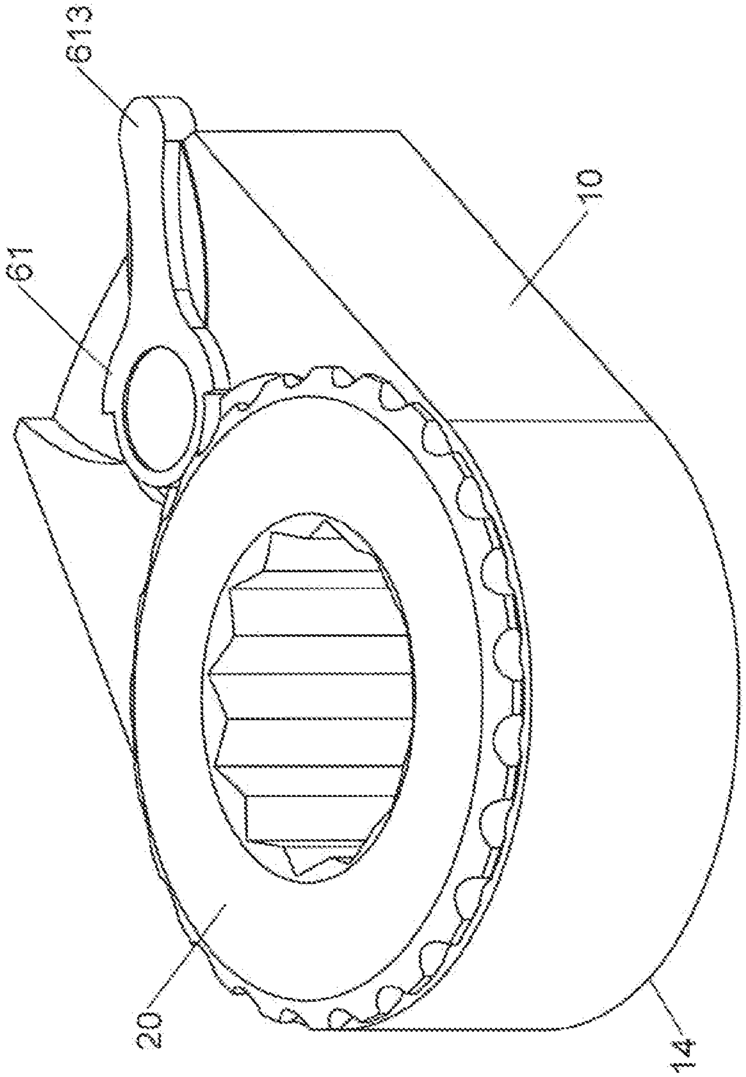
FIG. 14 is a perspective view of the ratchet wrench in accordance with the second preferred embodiment of the present invention.
Figure 15:
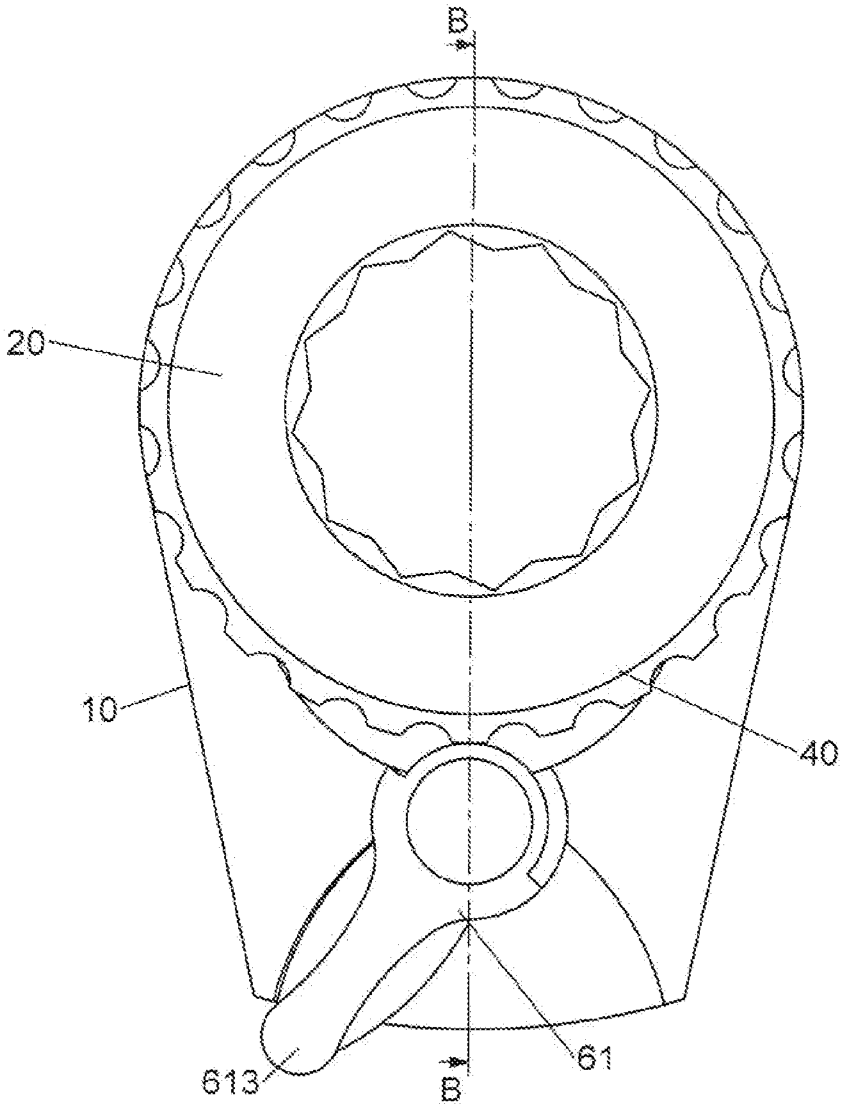
FIG. 15 is a top view of the ratchet wrench in accordance with the second preferred embodiment of the present invention.
Figure 16:
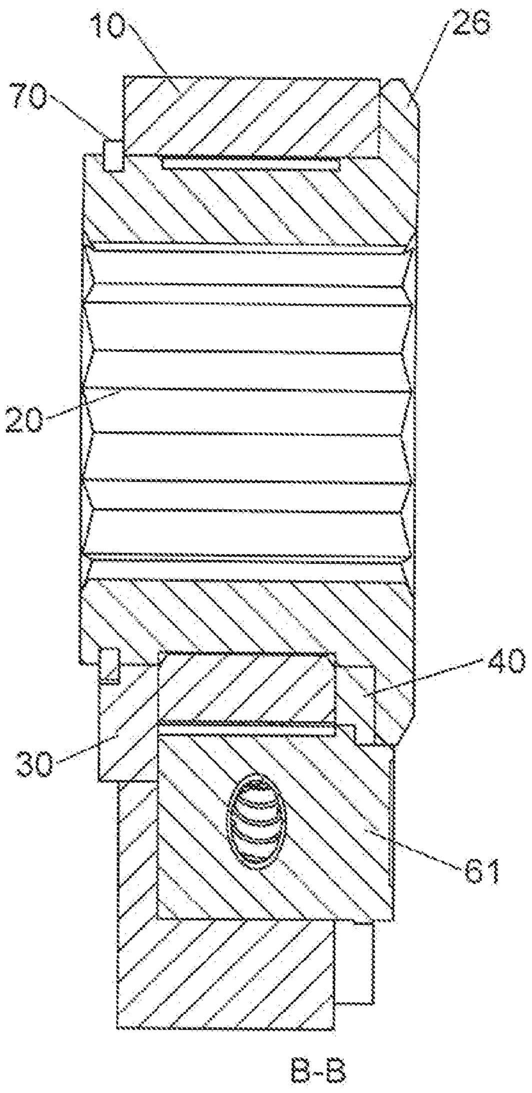
FIG. 16 is a cross-sectional view of the ratchet wrench taken along line B-B as shown in FIG. 15.

Referring to FIGS. 10-12 with reference to FIGS. 1-3, the ratchet wheel 20 is mounted on the wrench body 10 reversely. The rotation portion 26 rests on the first resting face 13. The rotation portion 26 restricts the second restriction member 40 and the direction control unit 60 to prevent the second restriction member 40 and the direction control unit 60 from being detached from the wrench body 10. The first snap ring 70 is snapped into the first annular groove 24 and rests on the second resting face 14. Thus, the first snap ring 70 restricts the ratchet wheel 20 and the first restriction member 30, to prevent the ratchet wheel 20 and the first restriction member 30 from being detached from the wrench body 10.

Referring to FIGS. 13-16 with reference to FIGS. 10-12, the pawl member 50 is limited between the first restriction member 30 and the second restriction member 40, and the rotation member 61 is limited by the second restriction member 40. The drive knob 613 protrudes from the fourth receiving recess 18. The drive knob 613 is driven leftward and rightward to abut the first side face 181 or the second side face 182.

Accordingly, the ratchet wrench of the present invention has the following advantages.

1. The first receiving recess 11 penetrates the wrench body 10, and the second receiving recess 12 also penetrates the wrench body 10. Thus, when the cutting tool is used to work the first receiving recess 11 and the second receiving recess 12, it is unnecessary to control the working depth of the cutting tool, thereby facilitating the efficiency for working the wrench body 10.

2. The first receiving recess 11 and the second receiving recess 12 are worked and molded by drills. The first receiving recess 11, the second receiving recess 12, and the third receiving recess 17 are worked by the same machine. The first receiving recess 11, the second receiving recess 12, and the third receiving recess 17 are drilled in the same direction. Thus, the tolerance will not be accumulated.

3. Each of the first receiving recess 11 and the second receiving recess 12 has two open ends. The wrench body 10 is initially molded by forging, and then molded on a die by a secondary stamping, to completely form the first receiving recess 11, the second receiving recess 12, the first resting face 13, the second resting face 14, the first arcuate face 15, and the second arcuate face 16.

4. The operator selects the drill working or the stamping according to a quality requirement of the first receiving recess 11 and the second receiving recess 12, so that the wrench body 10 has multiple working options.

5. With reference to FIGS. 1 and 9, the rotation portion 26 abuts the second resting face 14. The first snap ring 70 is snapped into the first annular groove 24 and rests on the first resting face 13. Thus, the ratchet wheel 20, the first restriction member 30, the second restriction member 40, the pawl member 50, and the direction control unit 60 are assembled on the wrench body 10 to finish assembly of the ratchet wrench. Thus, the first snap ring 70 facilitates assembly of the ratchet wrench.

6. The rotation portion 26 rests on the second resting face 14, and the first snap ring 70 rests on the first resting face 13, so that the ratchet wheel 20 is limited by the rotation portion 26 and the first snap ring 70 and is pivotally mounted in the first receiving recess 11. In addition, the first restriction member 30, the second restriction member 40, the pawl member 50, and the direction control unit 60 are limited by the rotation portion 26 and the first snap ring 70 and will not be detached from the wrench body 10. Thus, all of the elements are restricted.

7. The second restriction member 40 restricts the direction control unit 60 so that the direction control unit 60 will not be detached from the third receiving recess 17. Then, the first restriction member 30, the second restriction member 40, and the pawl member 50 are limited by the ratchet wheel 20 and the first snap ring 70 and will not be detached from the wrench body 10. Then, the ratchet wheel 20 is limited by the rotation portion 26 and the first snap ring 70 and is pivotally mounted in the first receiving recess 11. Thus, all of the elements are restricted.

8. The first restriction member 30, the second restriction member 40 directly close the second receiving recess 12, so that it is unnecessary to provide other element to close the second receiving recess 12. Thus, the second receiving recess 12 may be designed to penetrate the wrench body 10.

9. The ratchet wrench only contains the wrench body 10, the ratchet wheel 20, the first restriction member 30, the second restriction member 40, the pawl member 50, and the direction control unit 60, so that the ratchet wrench has a simplified construction with fewer parts.

10. In assembly, the direction control unit 60 is initially mounted in the third receiving recess 17. Then, the first restriction member 30, the second restriction member 40, the pawl member 50 are assembled and placed into the second receiving recess 12. Then, the ratchet wheel 20 is mounted in the first receiving recess 11. Finally, the first snap ring 70 is mounted on the wrench body 10. Thus, the ratchet wrench is assembled easily and rapidly.

11. The first snap ring 70 rests on the first resting face 13. Thus, the operator only needs to release the first snap ring 70 to remove the ratchet wheel 20, the first restriction member 30, the second restriction member 40, the pawl member 50, and the direction control unit 60 from the wrench body 10 for replacement. Thus, the ratchet wrench facilitates repair and maintenance, and the parts of the ratchet wrench are replaced quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A ratchet wrench comprising:

a wrench body, a ratchet wheel, a first restriction member, a second restriction member, a pawl member, a direction control unit, and a first snap ring;

wherein:

the wrench body is provided with a first receiving recess which has a circular shape and penetrates the wrench body;

the wrench body is provided with a second receiving recess beside the first receiving recess;

the second receiving recess is connected to the first receiving recess;

the second receiving recess has a center disposed in the first receiving recess and has a diameter less than that of the first receiving recess;

the second receiving recess has a circular shape and penetrates the wrench body;

the wrench body is provided with a first resting face and a second resting face;

the first resting face has a planar shape;

the second resting face has a planar shape;

the first receiving recess has a first arcuate face;

the first arcuate face is an internal arcuate face with a single diameter;

the second receiving recess has a second arcuate face;

the second arcuate face is an internal arcuate face with a single diameter;

the wrench body is provided with a third receiving recess beside the second receiving recess;

the third receiving recess is connected to the second receiving recess;

the third receiving recess has a diameter less than that of the second receiving recess;

the third receiving recess has an open first end and a closed second end;

the wrench body is provided with a fourth receiving recess beside the third receiving recess;

the fourth receiving recess is connected to the third receiving recess;

the fourth receiving recess is a cavity;

the wrench body is serially provided with the first receiving recess, the second receiving recess, the third receiving recess, and the fourth receiving recess;

the fourth receiving recess is provided with a first side face and a second side face;

the first side face and the second side face are arranged symmetrically relative to the fourth receiving recess;

the ratchet wheel is pivotally mounted in the first receiving recess and has a periphery provided with a ratchet portion having an annular shape;

the ratchet wheel has a center provided with a mounting portion;

the ratchet wheel has a first end provided with a first pivot portion pivotally mounted in the first receiving recess;

the first pivot portion has a diameter more than or equal to a maximum diameter of the ratchet portion;

the ratchet wheel is provided with a first annular groove directed toward the first resting face;

the ratchet wheel has a second end provided with a second pivot portion pivotally mounted in the first receiving recess;

the ratchet portion is disposed between the first pivot portion and the second pivot portion;

the first pivot portion and the second pivot portion are arranged symmetrically relative to the ratchet portion;

the second pivot portion has a diameter equal to that of the first pivot portion and more than or equal to the maximum diameter of the ratchet portion;

the ratchet wheel is provided with a protruding rotation portion having a maximum diameter;

the rotation portion abuts the second resting face;

the first restriction member is assembled with the wrench body and received in the second receiving recess;

the first restriction member is provided with a first resting portion;

the first restriction member is provided with a third arcuate face pivotally mounted on the second pivot portion;

the third arcuate face and the first arcuate face have a same axis and a same diameter;

the first restriction member is provided with a fourth arcuate face abutting the second arcuate face;

the fourth arcuate face and the second arcuate face have a same axis and a same diameter;

the second restriction member is assembled with the wrench body and received in the second receiving recess;

the second restriction member is parallel with the first restriction member with an interval being defined therebetween;

the second restriction member is provided with a second resting portion;

the second restriction member is provided with a fifth arcuate face pivotally mounted on the first pivot portion;

the fifth arcuate face and the first arcuate face have a same axis and a same diameter;

the second restriction member is provided with a sixth arcuate face abutting the second arcuate face;

the sixth arcuate face and the second arcuate face have a same axis and a same diameter;

the second restriction member is provided with a first abutting portion;

the first abutting portion and the third receiving recess have a same axis and a same diameter;

the first abutting portion is a concave groove;

the first abutting portion is provided with a first abutting edge directed toward the third receiving recess;

the pawl member is received in the second receiving recess and movable in the second receiving recess;

the pawl member is disposed between the first restriction member and the second restriction member;

the pawl member has a first side provided with an engaging portion meshing with the ratchet portion;

the pawl member has a second side having a center provided with a concave cavity directed toward the third receiving recess;

the direction control unit is pivotally mounted in the third receiving recess, and is rotatable in the third receiving recess to drive and move the pawl member in the second receiving recess, to control rotation of the ratchet wheel in a normal direction and a reverse direction;

the direction control unit includes a rotation member, a push member, and an elastic member;

the rotation member has a cylindrical shape;

the rotation member is pivotally mounted in the third receiving recess and provided with a receiving chamber;

the rotation member is provided with a second abutting edge restricted by the first abutting edge to prevent the rotation member from being detached from the third receiving recess;

the rotation member is provided with a drive knob received in the fourth receiving recess;

the drive knob is provided with a third side face and a fourth side face;

the third side face rests on the first side face;

after the drive knob is rotated, the fourth side face rests on the second side face;

the push member is received in the receiving chamber;

the elastic member is elastically biased between the receiving chamber and the push member;

the push member is pushed by the elastic member and presses the concave cavity so that the engaging portion meshes with the ratchet portion;

the first snap ring is snapped into the first annular groove and rests on the first resting face so that the ratchet wheel is pivotally mounted in the first receiving recess;

the first abutting edge restricts the second abutting edge so that the direction control unit is pivotally mounted in the third receiving recess;

the rotation portion rests on the second resting face and restricts the first resting portion to prevent the first restriction member from being detached from the second receiving recess;

the first snap ring pivotally mounts and restricts the ratchet wheel to prevent the ratchet wheel from being detached from the first receiving recess;

the first snap ring restricts the second resting portion to prevent the second restriction member from being detached from the second receiving recess; and the ratchet wheel, the first restriction member, the second restriction member, the pawl member, and the direction control unit are assembled on the wrench body.

2. The ratchet wrench as claimed in claim 1, wherein the first side face is an arcuate face, and the second side face is an arcuate face.

3. The ratchet wrench as claimed in claim 1, wherein the mounting portion is a polygonal hole or a protruding square head.

4. The ratchet wrench as claimed in claim 1, wherein:

the first restriction member has an end face slightly protruding from the second resting face;

the first restriction member has a shape similar to that of the second receiving recess; and the first restriction member has a cross-sectional area slightly equal to that of the second receiving recess.

5. The ratchet wrench as claimed in claim 1, wherein:

the second restriction member has an end face slightly protruding from the first resting face;

the second restriction member has a shape similar to that of the second receiving recess; and the second restriction member has a cross-sectional area slightly equal to that of the second receiving recess.

6. The ratchet wrench as claimed in claim 1, wherein the third side face is a convex face, and the fourth side face is a convex face.

7. The ratchet wrench as claimed in claim 1, wherein the push member is a column with a recess.

8. The ratchet wrench as claimed in claim 1, wherein the first snap ring has a C-shaped profile.

9. The ratchet wrench as claimed in claim 1, wherein:

the ratchet wheel is mounted on the wrench body reversely;

the rotation portion rests on the first resting face;

the rotation portion restricts the second restriction member and the direction control unit to prevent the second restriction member and the direction control unit from being detached from the wrench body;

the first snap ring is snapped into the first annular groove and rests on the second resting face;

the first snap ring restricts the ratchet wheel and the first restriction member, to prevent the ratchet wheel and the first restriction member from being detached from the wrench body;

the pawl member is limited between the first restriction member and the second restriction member; and the rotation member is limited by the second restriction member.

* * * * *